United States Patent [19]

Yoshida

[11] Patent Number: 5,500,944
[45] Date of Patent: Mar. 19, 1996

[54] FAULT INDICATION SYSTEM IN A CENTRALIZED MONITORING SYSTEM

[75] Inventor: Kojun Yoshida, Kawasaki, Japan

[73] Assignee: Fujitsu Limited, Kawasaki, Japan

[21] Appl. No.: 277,328

[22] Filed: Jul. 19, 1994

[30] Foreign Application Priority Data

Jan. 10, 1994 [JP] Japan .................................. 6-013243

[51] Int. Cl.⁶ ..................................................... G06F 11/00
[52] U.S. Cl. ............................... 395/184.01; 395/185.01; 395/183.15
[58] Field of Search .................................. 395/575, 550; 371/20.1, 16.5, 18; 364/474.16, 550

[56] References Cited

U.S. PATENT DOCUMENTS 3,623,013  11/1971  Perkins ................................. 340/172.5
4,497,037  1/1985  Kato et al. ............................... 364/900
5,084,875  1/1992  Weinberger et al. .................... 371/29.1

Primary Examiner—Robert W. Beausoliel, Jr.
Assistant Examiner—Ly V. Hua
Attorney, Agent, or Firm—Greer, Burns & Crain, Ltd.

[57] ABSTRACT

The present invention relates to a fault indication system in a centralized monitoring system for monitoring multiple devices speedily identifies and indicates a fault which is occurring, to improve maintenance of the monitored devices. The fault indication system includes multiple devices to be monitored, hierarchical multiple intermediate monitoring devices and a centralized monitoring device. The multiple devices to be monitored are connected to the centralized monitoring device via the hierarchical multiple intermediate monitoring devices. The centralized monitoring device is provided with time management tables corresponding to each of the multiple devices to be monitored and the hierarchical multiple intermediate monitoring devices. Information indicating the latest fault occurrence is recorded in the time management tables.

6 Claims, 9 Drawing Sheets

TIME MANAGEMENT TABLES

INTERMEDIATE MONITORING DEVICE

DEVICES TO BE MONITORED

TIME MANAGEMENT TABLES

HIGHER INTERMEDIATE MONITORING DEVICE (HIM)
- HIM DEVICE #1 : TIME
- HIM DEVICE #2 : TIME
- ...
- HIM DEVICE #N : TIME (30)

LOWER INTERMEDIATE MONITORING DEVICE (LIM)
- LIM DEVICE #1 : TIME
- LIM DEVICE #2 : TIME
- ...
- LIM DEVICE #N : TIME (31)

TRANSMISSION DEVICES (TX)
- TX DEVICE #1 : TIME → *
- TX DEVICE #2 : TIME → ** LINKED TO THE RECEIVED MESSAGE
- ...
- TX DEVICE #N : TIME (32)

RECEIVED MESSAGE : TIME (33)

TIME (34)

TIME (35)

\* END
\*\* TOP

*Fig. 3*

FAULT INDICATION SYSTEM IN A CENTRALIZED MONITORING SYSTEM

The present invention relates to a fault indication system in a centralized monitoring system. More particularly, it relates to a fault indication system in a centralized monitoring system for monitoring multiple devices from one or more central locations.

BACKGROUND OF THE INVENTION

In recent years, demand for a centralized monitoring system which monitors multiple devices which are spread out over many remote locations has increased. There is also a demand for maintenance operations which are more efficient.

A conventional structure of the centralized monitoring system will be explained, based on FIGS. 9 and 10.

FIG. 9 is a diagram of a system structure of a general centralized monitoring system. In FIG. 9, reference numerals 911 through 932 designate devices to be monitored. For example, they could be transmission devices in a transmission system.

The multiple devices 911 through 932 are arranged in multiple groups. For example, in FIG. 9, the devices 911 and 912 belong to one group, or one region, and the condition of these devices 911 and 912 is monitored by a corresponding intermediate monitoring device 91.

In the same way, the devices 921 and 922 are monitored by an intermediate monitoring device 92, and the devices 931 and 932 are monitored by an intermediate monitoring device 93.

Further, information from the devices 911 through 932 to be monitored is collected and monitored by the centralized monitoring device 90 via the intermediate monitoring devices 91, 92 and 93.

In such a general centralized monitoring system, the information from the devices 911 through 932 is sent to the corresponding intermediate monitoring devices 91 through 93 in the form of a message such as a telegram or the like. The messages sent from the devices 911 through 932 are received via the intermediate monitoring devices 91 through 93 in the centralized monitoring device 90. The messages specify the device in which the fault is occurring and the details of the fault.

The centralized monitoring device 90 has a storage device which stores a finite set of the faults in a time base, when the messages from the monitored devices are received. Restoration times are also recorded.

FIG. 10 shows the above-described operation. In FIG. 10, reference numerals 100 through 103 are messages which include the information of the fault stored in the time base in the order of the fault occurrence.

In FIG. 10, the message 100 indicates the occurrence of a fault A, which happens at the earliest time, and the message 101 indicates the restoration of a fault B, which is sent after that. Similarly, the message 102 records the occurrence of a fault C, which is received and recorded at a later time. Further, with the message 103 the restoration of the fault A is received and stored.

A pointer 104 is provided in the storage device. This pointer marks the latest data. That is, the message 103 for indicating the restoration of the fault A is marked by the pointer 104 in FIG. 10.

In the monitoring indication system in the conventional centralized monitoring system, only the latest data marked by the pointer is indicated, when the operator requests that faults be indicated.

As described above, only a single fault can be monitored effectively in the conventional system. However, there are problems in the conventional system as follows. One problem is that only the latest data marked by the pointer is indicated, as shown in FIG. 10, although the information required by the person in charge of maintenance includes the fault which is occurring currently. Accordingly, where the fault stored first has already been restored, the fault indication of the pointer is meaningless.

Another problem is that information about previous faults cannot be reviewed because the pointer only marks the latest data. It is possible to store indications of past faults when the messages stored in the storage circuit are later checked. However, it takes too much time to find indications of past faults because bulky information must be checked.

Further, the storage device has limited capacity, so the device can only store a finite set of information, and information relating to the faults is limited.

Accordingly, it is an object of the present invention to provide a centralized monitoring system to solve these problems with conventional systems.

SUMMARY OF THE INVENTION

In keeping with one aspect of the invention, a fault indication system in a centralized monitoring system for monitoring multiple devices speedily identifies and indicates a fault which is occurring, and improves maintenance of the monitored devices. The fault indication system includes multiple devices to be monitored, hierarchical multiple intermediate monitoring devices and a centralized monitoring device. The multiple devices to be monitored are connected to the centralized monitoring device via the hierarchical multiple intermediate monitoring devices. The centralized monitoring device is provided with time management tables corresponding to each of the multiple devices to be monitored and the hierarchical multiple intermediate monitoring devices. Information indicating the latest fault occurrence is recorded in the time management table.

BRIEF DESCRIPTION OF THE DRAWINGS

FIG. 3 is a block diagram of the operation of the present invention;

DETAILED DESCRIPTION

Figure 1:
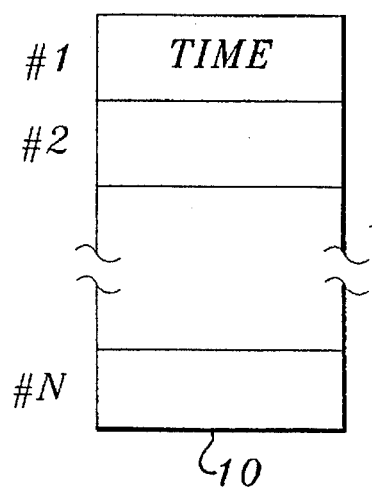
FIG. 1 is a block diagram showing a time table for explaining the principles of the present invention.
Figure 1:
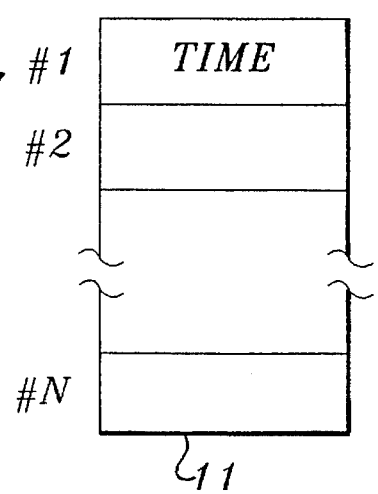

FIG. 1 is an explanatory diagram of the principle of the present invention, and shows an example of a time management table provided for the multiple hierarchical intermediate monitoring devices and the devices to be monitored. This time management table is provided in the centralized monitoring device.

In FIG. 1, reference numeral 10 is a time management table provided for the multiple hierarchical intermediate monitoring devices and the devices to be monitored. This time management table is provided in the centralized monitoring device.

In FIG. 1, reference numeral 10 is a time management table for storing messages received from the devices to be monitored, for the intermediate monitoring devices #1 through #N. This time management table has storage tables required for the number of intermediate monitoring devices, that is, from #1~#N.

Reference numeral 11 is a time management table for storing the occurrence time of messages from each of the devices #1 through #N to be monitored and the details of the faults.

The devices #1 through #N in time management table 11 are monitored by one intermediate monitoring device, and the time management tables for the intermediate monitoring device and devices to be monitored are linked. That is, the time management table 11 corresponds to the devices to be monitored which are controlled by one intermediate monitoring device. In other words, the devices #1 through #N to be monitored are connected to one intermediate monitoring device.

Figure 2:
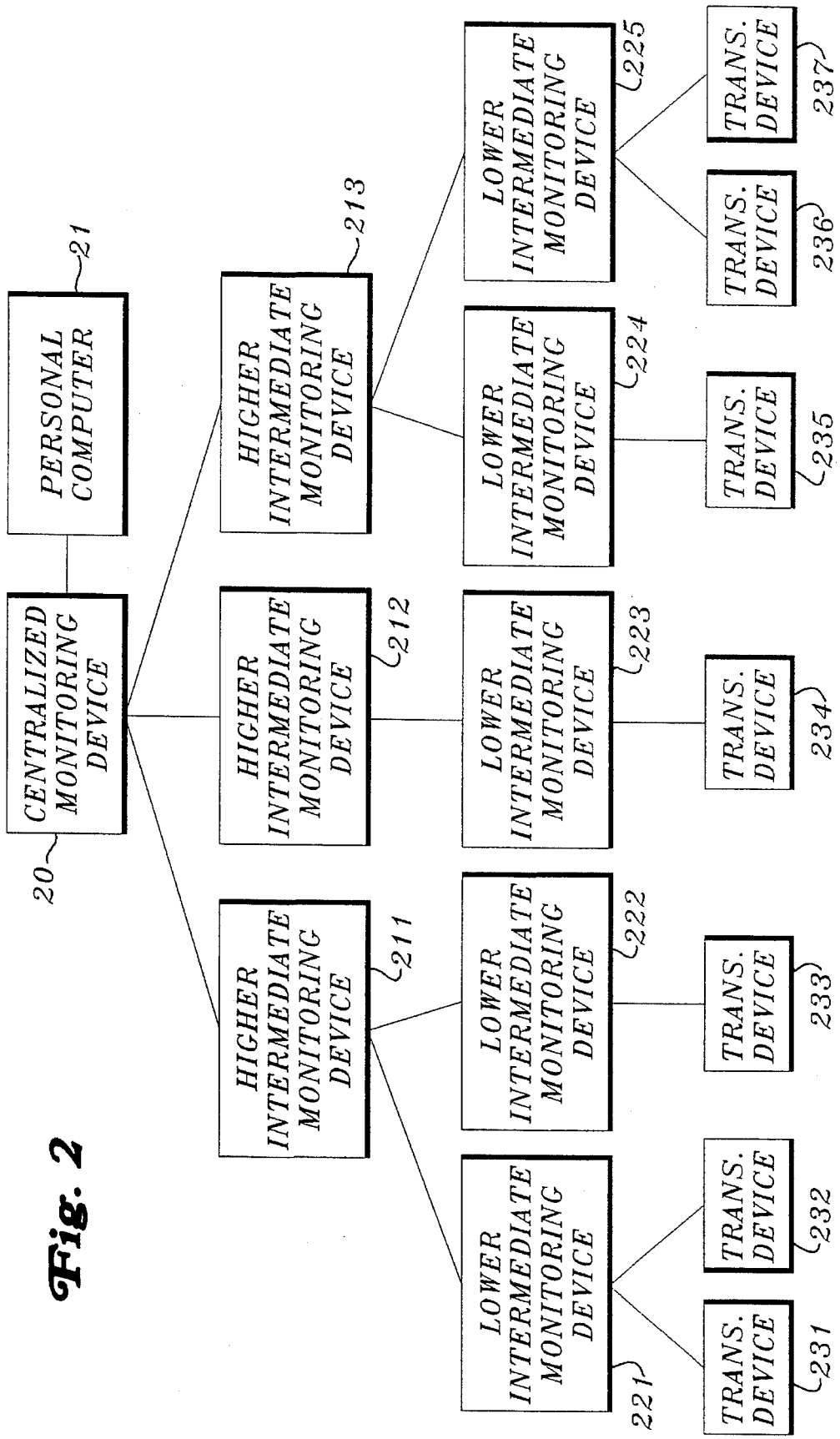
FIG. 2 is a block diagram showing one example of a centralized monitoring system used to monitor multiple transmission devices.

As seen in FIG. 2, the present invention has multiple devices to be monitored, multiple hierarchical intermediate monitoring devices and one centralized monitoring device, based on this principle. The multiple devices to be monitored are connected to the centralized monitoring device via higher and lower hierarchical multiple intermediate monitoring devices.

Further, the centralized monitoring device has time management tables corresponding to each of the multiple devices to be monitored and the higher and lower hierarchical multiple intermediate monitoring devices, and stores the latest information for indicating the occurrence of faults to these time management tables.

As described above, the time management tables shown in FIG. 1 have the same hierarchy as the centralized monitoring system according to the present invention. The time when the latest fault occurs is stored in these time management tables.

Further, when messages from the devices to be monitored are received, the device receiving the messages updates each table according to the hierarchy to which the device belongs, when the fault is occurring. The occurrence of the fault is detected and indicated by tracing the time of the latest message from each table. Therefore, there is no need to indicate the restoration of any fault. Thus, it also becomes possible to retrieve information of past faults easily, by searching these time management tables.

FIG. 2 is a diagram showing one example of the centralized monitoring system for transmission devices according to the present invention. In FIG. 2, reference numerals 231 through 237 are multiple transmission devices which are monitored. These multiple transmission devices 231 through 237 are constituted in multiple groups.

That is, for example, the transmission devices 231 and 232 existing in one area are connected to a lower intermediate monitoring device 221 at the station level for managing the transmission devices 231 and 232. In the same way, the transmission device 233 is connected to the lower intermediate monitoring device 222.

The transmission devices 234 and 235 are connected to the lower intermediate monitoring devices 223 and 224, respectively. And further, the transmission devices 236 and 237 are connected to the lower intermediate monitoring device 225.

Furthermore, the lower intermediate monitoring devices 221 through 225 at the station level are connected to higher intermediate monitoring devices 211 through 213.

In FIG. 2, the lower intermediate monitoring devices 221 and 222 are connected to the higher intermediate monitoring device 211, the lower intermediate monitoring device 223 is connected to the higher intermediate monitoring device 212, and the lower intermediate monitoring devices 224 and 225 are connected to the higher intermediate monitoring device 213, respectively. In practice, each of the higher intermediate monitoring devices 211 through 213 can connect to a maximum of 30 intermediate monitoring devices at the station level. Further, the higher intermediate monitoring devices 211 through 213 are connected to the centralized monitoring device 20. The centralized monitoring device 20 can connect to a maximum of 24 higher intermediate monitoring devices in one embodiment of the present invention.

The centralized monitoring device 20 includes a personal computer 21 as one part of the device. The time management tables are stored in the personal computer 21 as explained later.

FIG. 3 is a diagram for explaining the operation of this embodiment of the present invention. In FIG. 3, reference numerals 30, 31 and 32 show time management tables in the memory of the personal computer 21. These time management tables correspond to the principle diagram of the present invention explained in FIG. 1. Reference numeral 30 is a time management table provided for each of the higher intermediate monitoring devices.

Time management table 31 corresponds to the intermediate monitoring unit of the station level, and time management table 32 corresponds to the transmission devices which are monitored.

These time management tables 30, 31 and 32 are linked through a hard disk drive or the like of the centralized monitoring device (CM) 20, according to the hierarchy of the centralized monitoring system shown in FIG. 2, respectively. Each time slot #1 through #N of the higher intermediate monitoring devices, the intermediate monitoring devices and the transmission devices exist in the time management tables 30, 31 and 32, respectively.

In the example shown in FIG. 2, the time management table 30 would have three control table areas corresponding to #1 through #3. These three management tables correspond to the higher intermediate monitoring devices 211 through 213, respectively. The time management tables 31 are for the lower intermediate monitoring devices, which are linked to one of the higher intermediate monitoring devices of #1~#N.

According to the system example shown in FIG. 2, for example, there are two intermediate monitoring devices 221 and 222 at the station level connected to the higher intermediate monitoring device 211, so the time management table 31 has two tables #1 and #2 for the device 211.

The intermediate monitoring device 221 will now be considered as one example. The transmission devices 231 and 232 are connected to the intermediate monitoring device 221. Accordingly, the time management table 32 linked to the time management table 31 corresponding to the station level intermediate monitoring device 221 has the tables #1 and #2, which correspond to the transmission devices 231 and 232, respectively.

Such time management tables 30 through 32 are recorded in the memory of the personal computer 21. The centralized monitoring device 20 stores these time management tables 30 through 32 in the memory of the personal computer 21, preferably in a hard disk device of the centralized monitoring device 20, linked with the received messages from a transmission device.

Tables 33 and 34 show one example of the received message and the time the message was received for one transmission device in FIG. 3. The centralized monitoring device 20 stores received messages, and notes the time when messages are received from the transmission devices 231 through 237. These messages are linked to the time management tables 32 in the personal computer 21.

Where information indicating the occurrence of a fault is included in the received message, the tables 30 and 31 and the transmission device table 32 are updated per the received times. When a request for indicating faults is made by an operator, the retrieval is started by using the above-described time management tables.

First, the intermediate monitoring device 211–213 which manages the transmission device in which the most recent fault is occurring is found from the time management table 30. Next, the higher intermediate monitoring device for monitoring the transmission device in which the latest fault is occurring is found from the time management table 31 for the higher intermediate monitoring devices.

Similarly, the transmission device in which the latest fault is occurring is found from the time management table for the transmission devices monitored by the found intermediate monitoring device.

The message indicating the latest fault is found from the messages for the transmission devices found as described above, and the fault which is occurring is indicated on a display. This retrieval processing is performed in the personal computer 21, using the flow charts shown in FIGS. 4 through 7o The operation of the retrieval processing in the personal computer 21 according to the process flows shown in FIGS. 4 through 7 will be explained as follows.

At first, the time management table 30 corresponding to the first intermediate monitoring device HIM is extracted. Then, the program is set as follows (Step S1):

HIM=HIM (#1)

NO.=1 i=1

Next, it is judged whether or not HIM(#i) is the last table of the time management table 30 (Step S2). If it is not the last table, i is increased (Step S3).

It is then judged whether or not the HIM is smaller than HIM (#i) (Step S4).

If the answer is yes (Y), it is judged whether or not the fault is occurring in HIM (#i) (Step S5).

If the answer is yes (Y), HIM=HIM(#i) and No.=i are set (Step S6).

Figure 4:
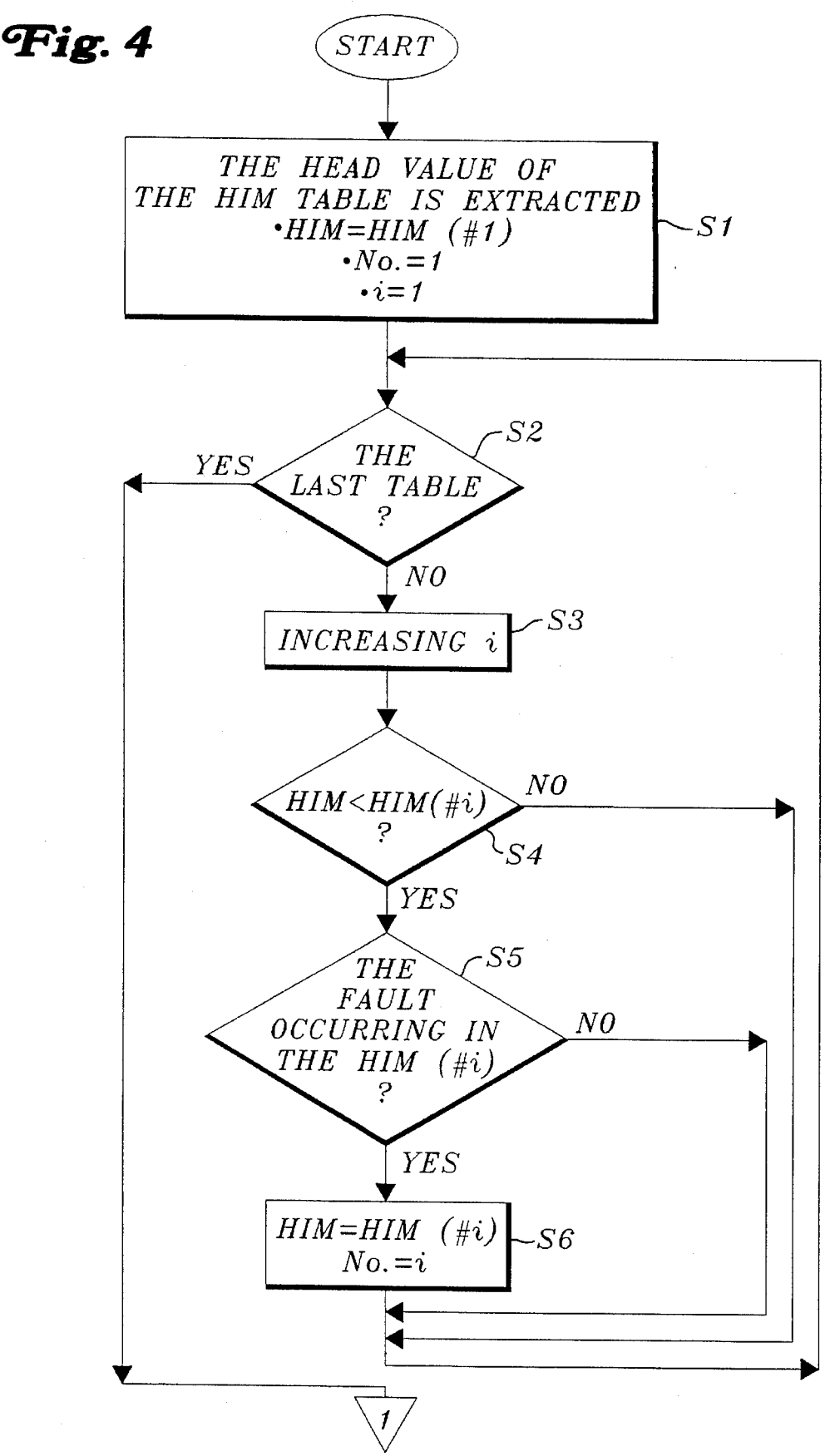
FIG. 4 is a flow chart used to identify faults according to the present invention.
Figure 5:
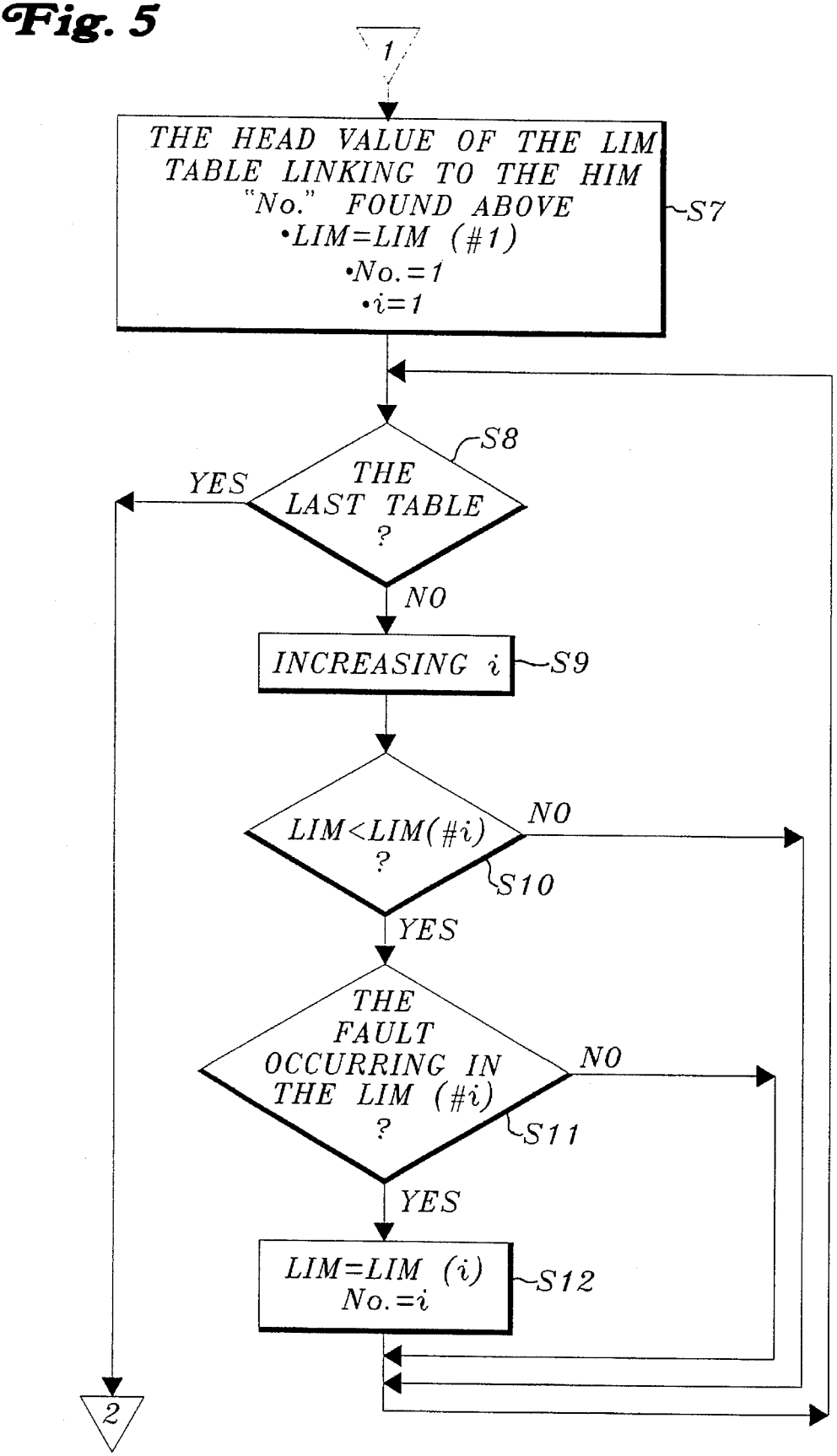
FIG. 5 is a continuation of the flow chart of FIG. 4.

Returning to step S2, if it is judged that it is the last time table 30, the time management table 31 of the first LIM linked to the HIM "No." found in FIG. 4 is extracted, as shown by the step S7 in FIG. 5. The program is set as follows:

LIM=LIM(#1)

No.=1 i=1

Figure 6:
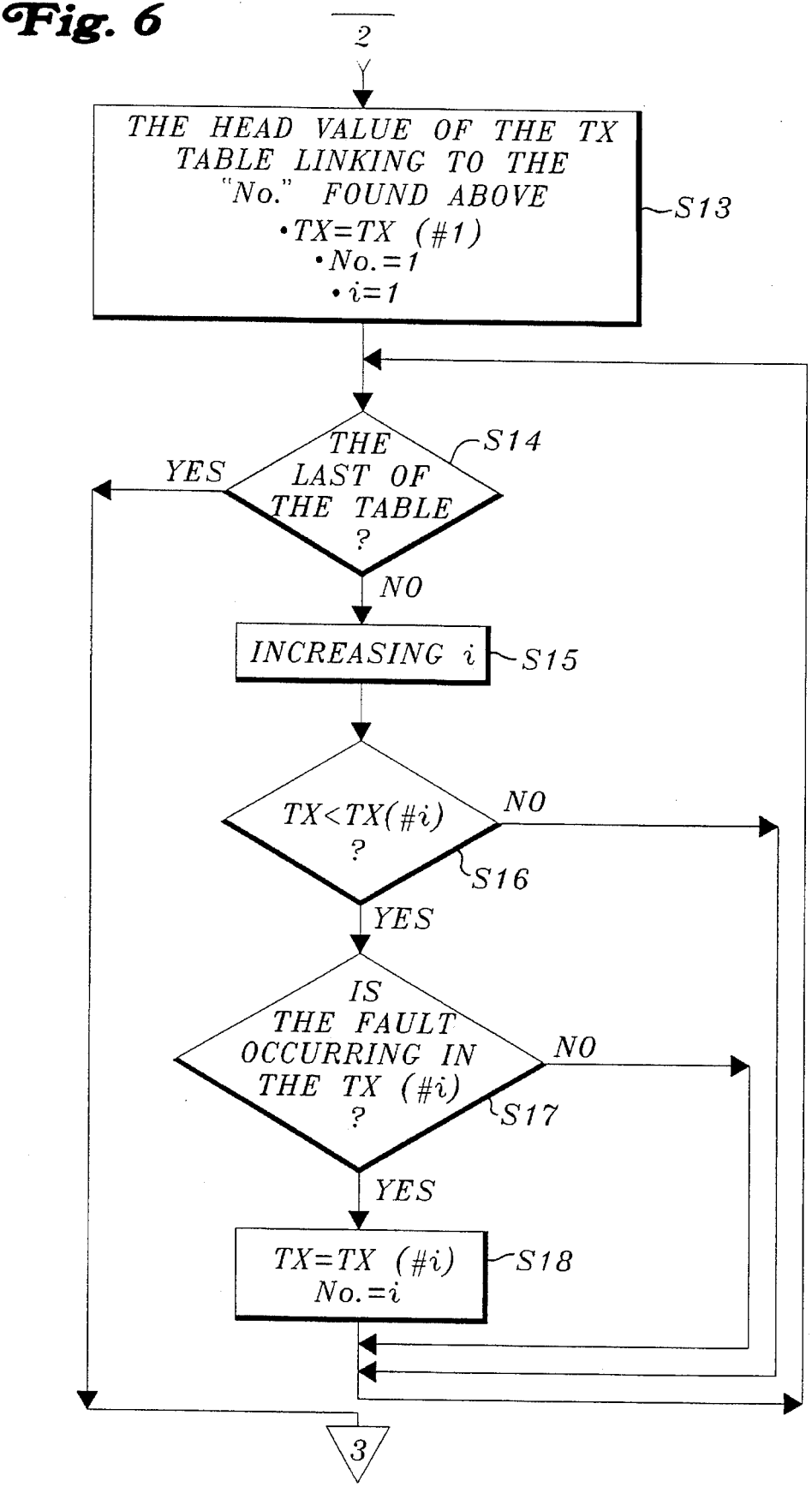
FIG. 6 is a continuation of the flow chart of FIG. 5.
Figure 7:
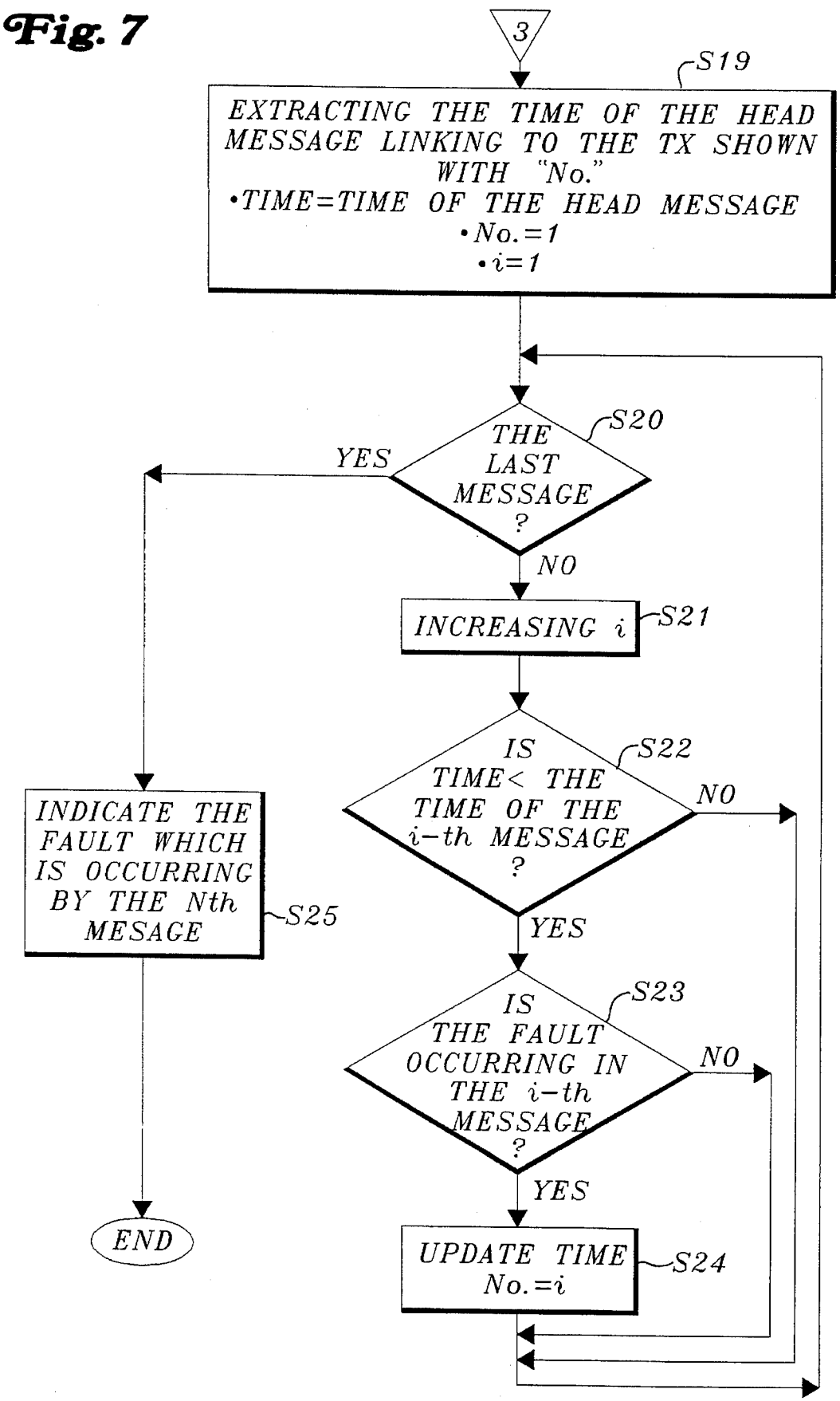
FIG. 7 is a continuation of the flow chart of FIG. 6.

It is judged whether or not it is the last time table 31. If the answer is no (N), the operation flow is the same as that explained in FIG. 4 (Steps S9 to S12). If it is the last time table, the time management table 32 of the first transmission device (TX) linked to the device (LIM) shown with "No." is extracted, as shown in FIG. 6 (Step S13).

Then the program is set as follows:

TX=TX (#1)

No.=1 i=1

Processing is performed for the time management table 32 of the transmission device (TX) in the same manner as the processing flows shown in FIGS. 4 and 5. In the time management table 32 of the transmission device, when the last table is reached, the program goes to the processing flow shown in FIG. 7. The above-described processing shown up to FIG. 6 is performed in the personal computer 21.

The time of the head message linked to the transmission device (TX) indicated by "No." in which the fault is occurring, detected in FIG. 6, is extracted from the messages stored in the centralized monitoring device (CM) (Step S19).

Then, the program is set as follows:

TIME=the time of the head message

No.=1 i=1

Next, it is judged whether or not it is the last message (Step S20). If it is not the last message, i is increased (Step S21).

Then it is judged whether or not the recorded TIME is smaller than the i-th time (Step S22). If so, it is judged whether or not the i-th message indicates the fault is occurring (Step S23). If it indicates the fault is occurring, TIME is updated and set to =i (Step S24).

Returning to step S20, if it is the last message, the fault occurring is indicated by the message received at the latest time (Step S25). Then, the processing flow for indicating the fault is finished.

Figure 8:
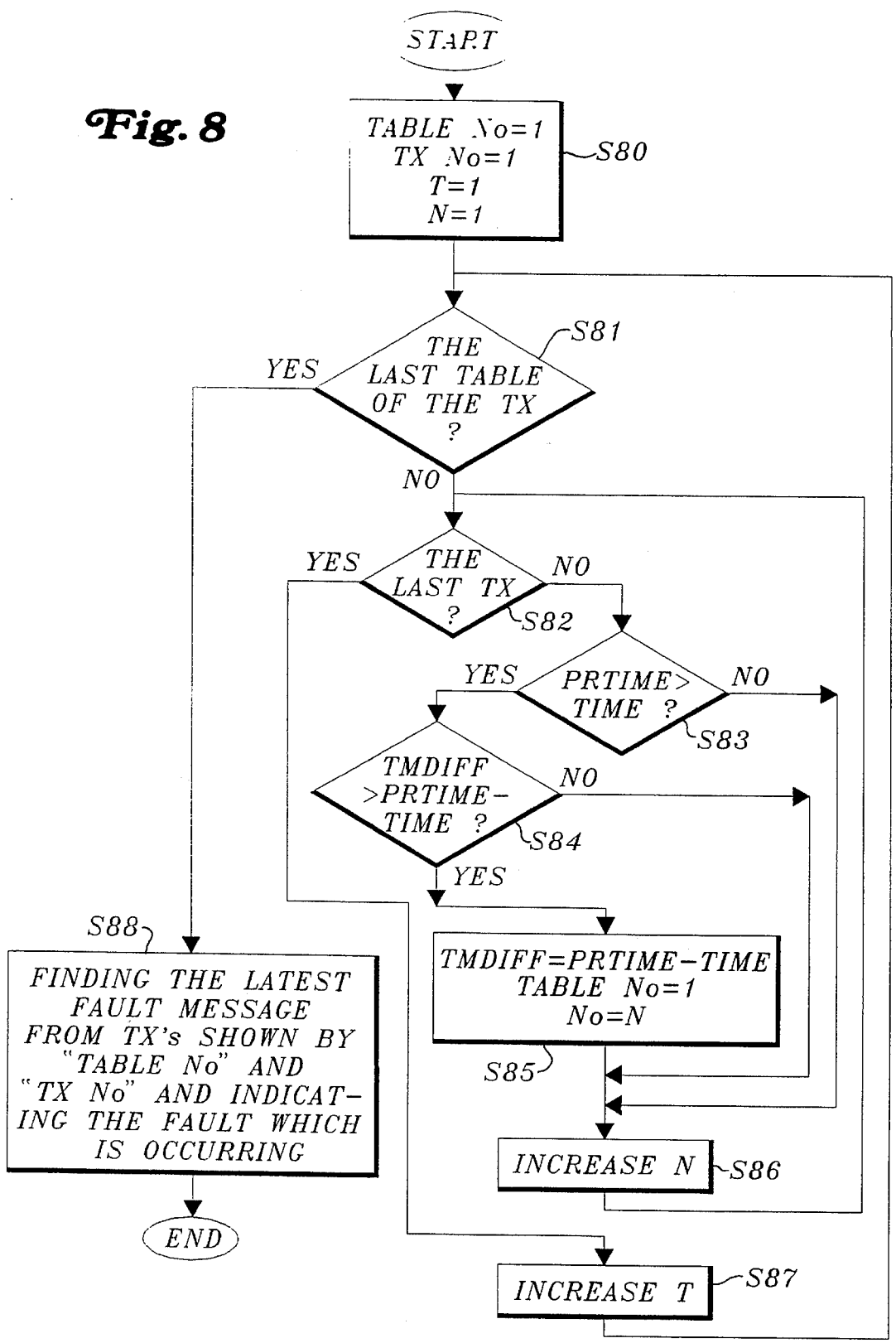
FIG. 8 is a flow chart showing the operation of a prior art centralized monitoring system.
Figures 9, 10:
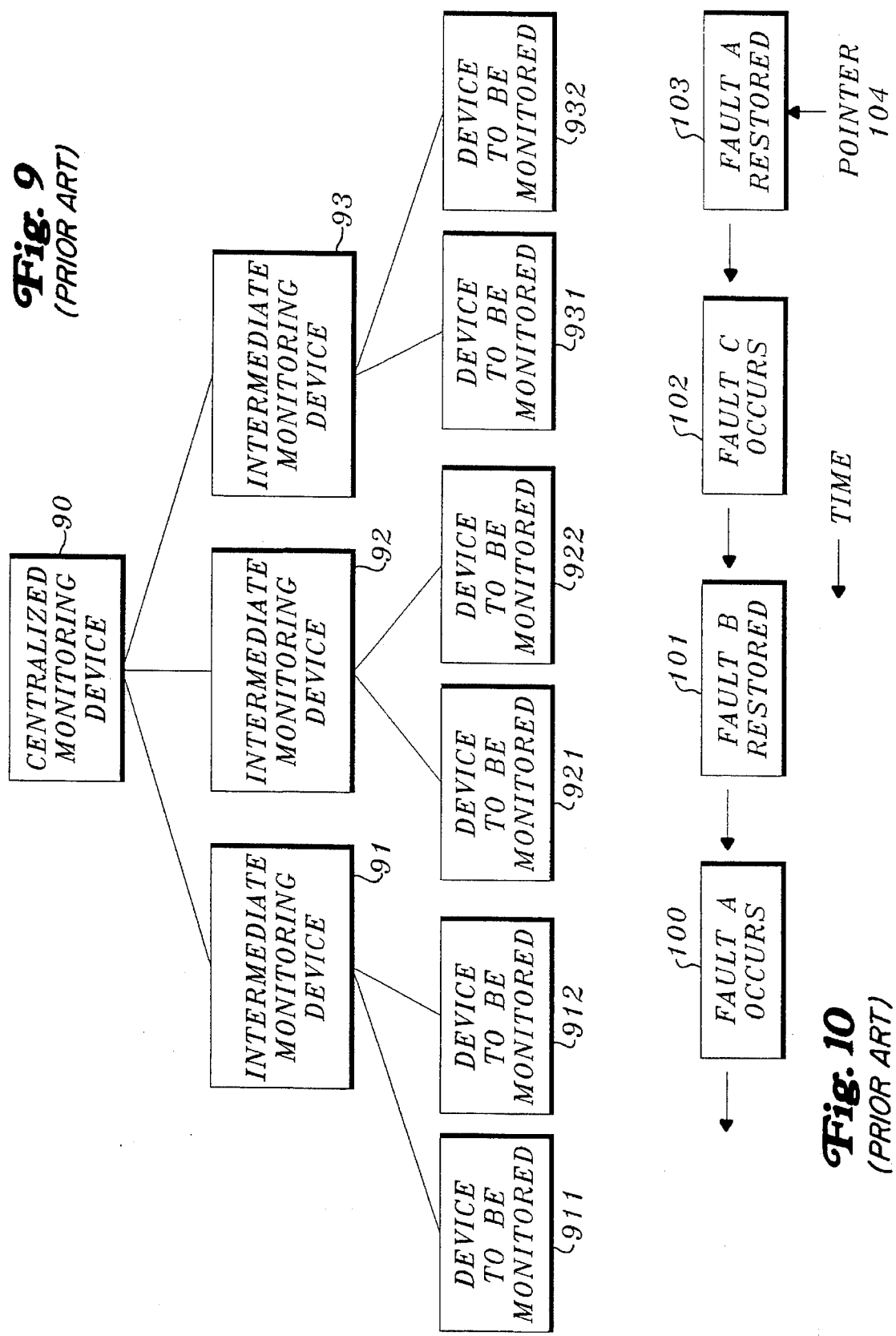
FIG. 9 is a diagram of a general centralized monitoring system according to the prior art.
FIG. 10 is a diagram showing the operation of the prior art system shown in FIG. 9.

Further, FIG. 8 is an operation flow chart for retrieving and indicating that a fault has occurred according to the present invention.

The indication that a fault has occurred is made by retrieving all of the faults which occurred before the last received message from the transmission device (TX) which is chosen from the time management table 32 of the transmission device (TX). In FIG. 8, Table No. is the table to which the transmission device (TX) belongs, and TX No. is a location in that table. The last message received which indicates a fault is occurring among the messages of the transmission device (TX) which was found is indicated on the display.

At first, 1 is set as the number of the time management table 32 to which the found transmission device belongs, and the location in the appropriate table is set as 1 (Step S80).

Next, it is judged whether or not it is the last table of the transmission device TX (Step S81). If it is not the last table of the transmission device, it is judged whether or not it is the last transmission device (Step S82). If it is not the last transmission device, it is judged whether or not the previous time PR TIME of the transmission device which is last chosen is later than the time TIME in the present time table (Step S83). If the time TIME in the present table is earlier than the time PRTIME, the program continues to Step S84. In steps S84 and S85, TMDIFF means a value set in a register which indicates the time difference or time lag between PRTIME and TIME. In Step 85, if TMDIFF>PRTIME-TIME, then the present time lag between PRTIME and TIME is smaller than the already set smallest time lag TMDIFF.

Then, in Step S85, the value of TMDIFF stored in the register is updated to "PRIME-TIME", which is the smallest time lag. Then the location N in the table is increased by 1 (Step S86). Returning to the Step S82, if it is the last transmission device, the time T in the table is increased by 1 (Step S87). Steps S83 through S85 are repeated until the last fault is found.

In this way, the retrieving operation for detecting the information which indicates the last fault will be finished.

As explained above according to the embodiment, it is possible to speedily retrieve and indicate faults which are occurring, and the efficiency of the maintenance operation in the centralized monitoring system is increased.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A fault indication system in a centralized monitoring system which detects fault conditions in multiple devices to be monitored comprising:

hierarchial multiple intermediate monitoring devices each connected to a selected plurality of the devices to be monitored; and a centralized monitoring device connected to said hierarchial multiple intermediate monitoring devices;

said centralized monitoring device having a computer with memory, said memory having a time management table for each of said multiple devices to be monitored and said hierarchial multiple intermediate monitoring devices, said centralized monitoring device recording in said time management tables the latest information indicating a fault occurrence in the monitored devices, said computer obtaining the latest information indicating the fault by reading said time management tables in said memory and processing said information in said time management tables to identify the latest information indicating a fault occurrence in time order.

2. A fault indication system in a centralized monitoring system according to claim 1 wherein said multiple devices to be monitored are transmission devices.

3. A fault indication system in a centralized monitoring system according to claim 2 wherein said centralized monitoring device comprises a computer having said computer memory.

4. A fault indication system in a centralized monitoring system according to claim 3 wherein the fault is communicated from said devices to be monitored by a message indicating the fault occurrence, said centralized monitoring device receiving and storing said message and noting the time when said message is received, said stored message being linked to each of said time management tables in the memory of said computer.

5. A fault indication system in a centralized monitoring system according to claim 3 wherein said time management tables of said intermediate monitoring devices to which said devices to be monitored belong and the devices to be monitored are updated at the time the message indicating the occurrence of a fault is received.

6. A fault indicating system in a centralized monitoring system according to claim 5 wherein said computer is programmed to locate the latest fault from said time management table corresponding to the intermediate monitoring devices in said hierarchial multiple intermediate monitoring devices and identify an intermediate monitoring device having a message indicating the latest fault received by the hierarchial multiple intermediate monitoring devices, said computer being further programmed to locate a lower intermediate monitoring device having the message indicating the fault occurring at the latest time from said time management table corresponding to the lower intermediate monitoring devices monitored by the higher intermediate monitoring device, said computer being further programmed to locate the devices to be monitored in which the fault is occurring at the latest time by the lower intermediate monitoring device which is found.

* * * * *